United States Patent [19]

Sugihara et al.

[11] Patent Number: 4,533,292
[45] Date of Patent: Aug. 6, 1985

[54] TURBINE ROTATABLE IN ONE DIRECTION IN A RECIPROCATING FLOW

[75] Inventors: Masahiro Sugihara; Etsuo Morishita; Tetsuo Hirai; Shin Sekiya, all of Hyogo, Japan

[73] Assignee: Mitsubishi Denki Kabushiki Kaisha, Tokyo, Japan

[21] Appl. No.: 505,551

[22] Filed: Jun. 17, 1983

[30] Foreign Application Priority Data

Jun. 17, 1982 [JP] Japan .................. 57-106031

[51] Int. Cl.³ .................. F01D 5/04; F03B 13/12
[52] U.S. Cl. .................. 415/2 R; 415/7; 415/149 A; 416/85
[58] Field of Search ............ 415/7, 2A-4 A, 415/149 A; 416/84-86, DIG. 8, 6

[56] References Cited

U.S. PATENT DOCUMENTS

| 1,611,341 | 12/1926 | Deriaz ............ 416/186 A X |
| 1,835,018 | 12/1931 | Darrieus .......... 416/227 A X |
| 4,012,163 | 3/1977 | Baumgartner ........ 415/2 R |
| 4,152,895 | 5/1979 | Wirt ................ 415/7 X |
| 4,162,410 | 7/1979 | Amick ............ 416/DIG. 8 |
| 4,221,538 | 9/1980 | Wells .............. 415/2 A |
| 4,264,279 | 4/1981 | Dereng ........... 416/DIG. 8 X |
| 4,271,668 | 6/1981 | McCormick ........... 60/398 |
| 4,313,711 | 2/1982 | Lee ................. 415/7 |
| 4,383,413 | 5/1983 | Wells ............... 60/398 |

FOREIGN PATENT DOCUMENTS

| 892130 | 10/1953 | Fed. Rep. of Germany.... 416/DIG. 8 |
| 3004910 | 8/1981 | Fed. Rep. of Germany.... 416/DIG. 8 |
| 1104137 | 11/1955 | France ............ 416/DIG. 8 |
| 250664 | 7/1948 | Switzerland ............. 415/7 |
| 160803 | 11/1921 | United Kingdom ............. 415/7 |
| 745084 | 2/1956 | United Kingdom .......... 416/117 |
| 2041458 | 9/1980 | United Kingdom ............. 415/7 |

Primary Examiner—Everette A. Powell, Jr.
Attorney, Agent, or Firm—Sughrue, Mion, Zinn, Macpeak, and Seas

[57] ABSTRACT

A turbine includes a plurality of blades mounted on a rotary pedestal such that the pedestal is rotatable in the same direction regardless of the direction of flow. Conversion efficiency is improved by generally locating the zero lift plane of the blades on a cylindrical or conical surface coaxial with the rotary output.

21 Claims, 24 Drawing Figures

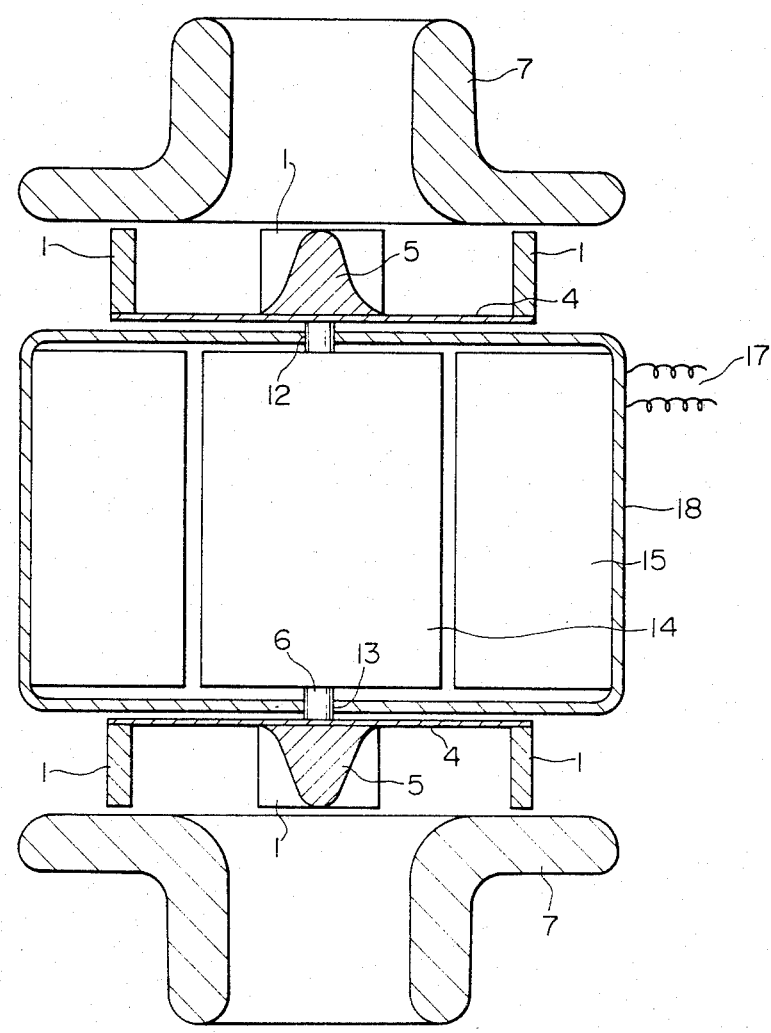

TURBINE ROTATABLE IN ONE DIRECTION IN A RECIPROCATING FLOW

BACKGROUND OF THE INVENTION

The present invention relates to a turbine or energy converting apparatus rotatable in only one direction in a reciprocating air or water flow obtainable by wind or wave power independently of the direction of the flow.

As to apparatus of this type, there has been known a turbine such as shown in FIG. 1. In FIG. 1(a), which is a front view of the conventional turbine, reference numeral 1 denotes a rotor blade and 2 denotes a rotary shaft. FIG. 1(b) is a cross-section of the rotor blade 1 along the line 1b–1b in FIG. 1(a). The rotor blade 1 has a cross-section such as is generally known as a symmetrical blade form in the field of aerodynamics. Such a proposal can be found, for example in Japanese Patent Application Laid-Open No. 92060/1978.

In FIG. 2, it is assumed that the rotor blade 1 shown in section is moving with a velocity U as indicated in the drawing. Assuming that a flow comes in with a velocity V substantially perpendicularly to the moving direction of the rotor blade 1, the relative velocity of the flow with respect to the rotor blade can be expressed by W, as indicated in FIG. 2 on the velocity triangle. From hydrodynamics, it is known that the relative velocity W produces dyamic lift L in the rotor blade perpendicularly to the relative velocity W, and reaction (drag) in the same direction as W. The flow force Ft along the travelling direction t to the rotor blade is expressed as follows, on the basis of the geometrical relationships.

$$F_t = L \sin \alpha - D \cos \alpha$$

where, $\alpha$ represents the angle of elevation, which is the angle formed between the travelling direction and the relative velocity direction of the rotor blade, and is therefore expressed by $\alpha = \tan^{-1} (V/U)$. If the angle of elevation $\alpha$ is properly selected, it is possible to make $F_t > 0$ and therefore it is possible to impart a driving force to the rotor blade in the direction t, under the condition of the existence of a flow.

Accordingly, in FIG. 1, if there exists a flow in the direction parallel to the rotary shaft 2, the flow force at the respective radii of the rotor blade 1 will become as shown in FIG. 2, so that the rotor blade 1 is enabled to rotate about the rotary shaft 2. Further, since a symmetrical blade form is employed for the rotor blade 1, it is possible to make the direction of the flow force Ft acting on the rotor blade 1 unchanged, independently of the direction of the flow parallel to the rotary shaft 2, from which directions the flow comes in. Therefore, it is possible to cause the rotor blade 1 to rotate in one direction in a reciprocating flow obtained, for example, by wave energy.

The conventional apparatus is arranged in the manner described above, and with respect to the rotor blade 1 per se, as shown in FIG. 3, since a uniform flow comes in to the rotor blade 1 with a velocity V, the peripheral speed of the rotor blade 1 is higher at the tip portion while lower at the hub portion. Accordingly, the elevation angle of the relative velocity W with respect to the rotor blade 1 changes at the respective radial positions of the rotor blade 1. In view of the characteristic of the blade, the fact that the elevation angle changes at the respective radial positions of the rotor blade 1 in spite of the existance of an optimum elevation angle means that it becomes impossible to operate at the optimum point, and it is essentially impossible to efficiently absorb energy in such a turbine. For example, in FIG. 3(a), assuming that the elevation angle is represented by $\alpha_t$ when tip peripheral velocity, the flow velocity and the relative velocity are represented by $U_t$, V and $W_t$ respectively, the elevation angle $\alpha_t$ is expressed by the following equation:

$$\alpha_t = \tan^{-1} (V/U_t).$$

Further assume that this elevation angle $\alpha_t$ is the optimum one in view of the form of the blade. In FIG. 3(b), at the hub portion, the elevation angle $\alpha_h$ is expressed by the following equation:

$$\alpha_h = \tan^{-1} (V/U_h).$$

Thus, $$U_t/U_h = \gamma_t/\gamma_h (>1)$$

where $\gamma$, $\gamma_t$, and $\gamma_h$ represent the rotor radius, the rotor radius at the tip portion and rotor radius at the hub portion, respectively.

Thus, naturally, $$\alpha_t > \alpha_h,$$

and when the ratio of the tip to hub radius is large, the elevation angle $\alpha_h$ becomes large so that the elevation angle may naturally cause the blade to enter a stalling range. As a matter of course, it is impossible to expect high efficiency in an arrangement which has a partial stalling range.

Further, as will be appreciated from FIG. 1, the rigidity changes largely in the radial direction at the respective radius positions and therefore it becomes difficult to make an evaluation of turbine performance, resulting in a design problem. This means that optimum rigidity can be selected only at a certain radii, creating a further impediment against obtaining high efficiency.

SUMMARY OF THE INVENTION

The present invention is intended to eliminate the above-mentioned drawbacks in the prior art, and an object of the present invention is to provide a turbine in which energy is efficiently derived from a reciprocating flow flowing into the turbine.

Another object of the present invention is to compensate for the drawbacks of the prior art using a blade form quite different from the conventional.

BRIEF DESCRIPTION OF THE DRAWINGS

FIG. 1 shows a conventional turbine rotatable in one direction in a reciprocating flow in which

FIG. 3 are diagrams explaining the velocity triangle of the conventional turbine, in which

FIG. 4 is a diagram explaining the mapping of the turbine utilizing the circular blade arrangement, in which

FIG. 6 shows an embodiment of the turbine according to the present invention in which

FIG. 8 shows an embodiment of a parallel system in which the blades are arranged on opposite sides of the pedestal and in which

FIG. 9 is a cross-section showing a further embodiment of the parallel system according to the present invention, in which a generator is arranged between two pedestals;

FIG. 12 shows another embodiment of the present invention in which a nozzle and a diffuser are provided and in which

FIG. 13 shows a further embodiment of the present invention, in which stator blades are provided and in which

DETAILED DESCRIPTION OF THE PREFERRED EMBODIMENTS

Figure 4A:
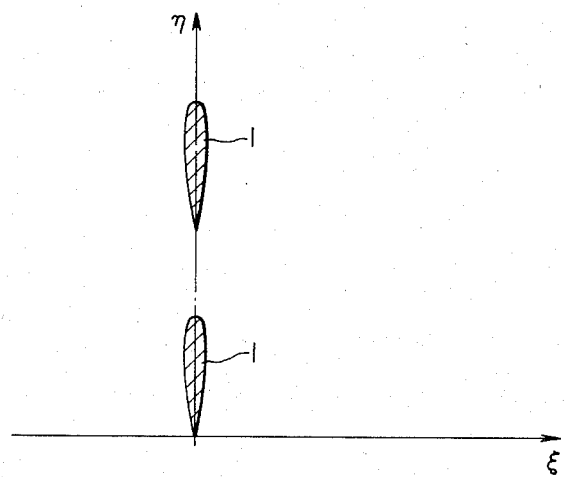
FIG. 4(a) shows a linear arrangement of blades and FIG. 4(b) shows a circular arrangement of blades.

FIG. 4(a) illustrates a blade alignment obtained by developing on a plane, cross-sections of a rotor blade 1 which are obtained by cutting the rotor blade 1 crosswise by a cylindrical surface coaxial with the rotary shaft 2. This blade alignment is of a symmetrical blade form similarly to the previously described case. Assume that the plane on which such a blade alignment exists is expressed by $(\xi,\eta)$. This space does not always indicate a physical space.

Figure 4B:
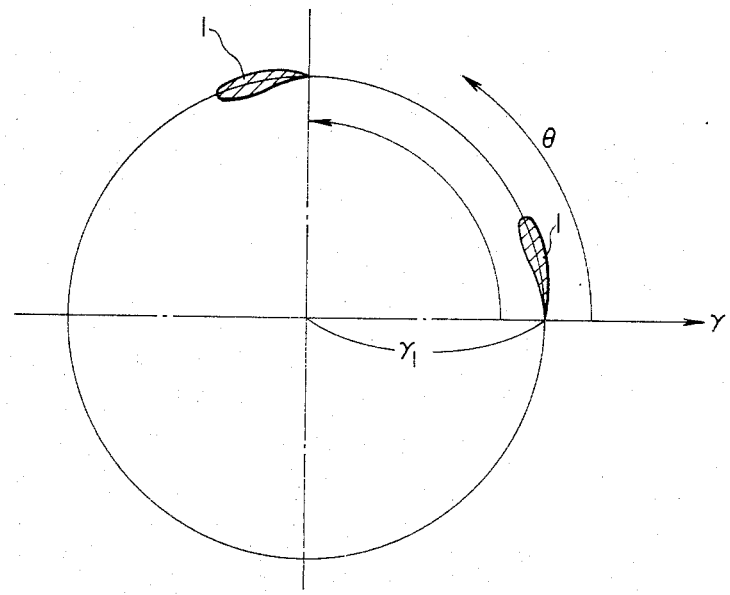

By conformal representation, for example, $$\xi = K \cdot \ln(\gamma/\gamma_1)$$

$$\eta = K \cdot \theta$$

where K and $\gamma_1$ are appropriate constants. It is possible to conformally map from the plane $(\xi, \eta)$ to the plane $(\gamma, \theta)$ using the above-mentioned mapping function. It is very easy to map from FIG. 4(a) to FIG. 4(b) using the abovenoted mapping function.

Figure 5A:
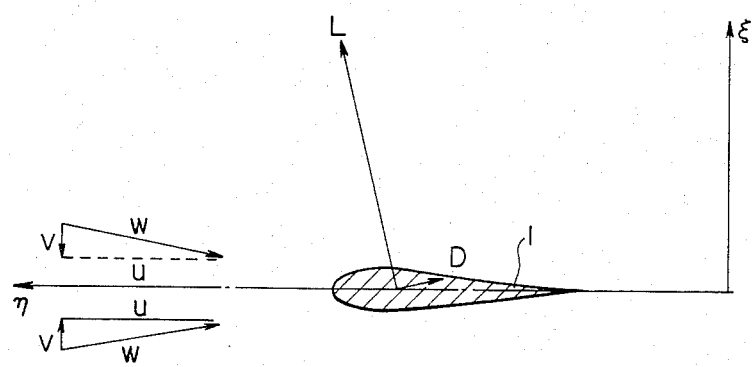
FIGS. 5(a) and 5(b) are diagrams explaining how the turbine according to the present invention operates in one direction in a reciprocating flow.
Figure 5B:
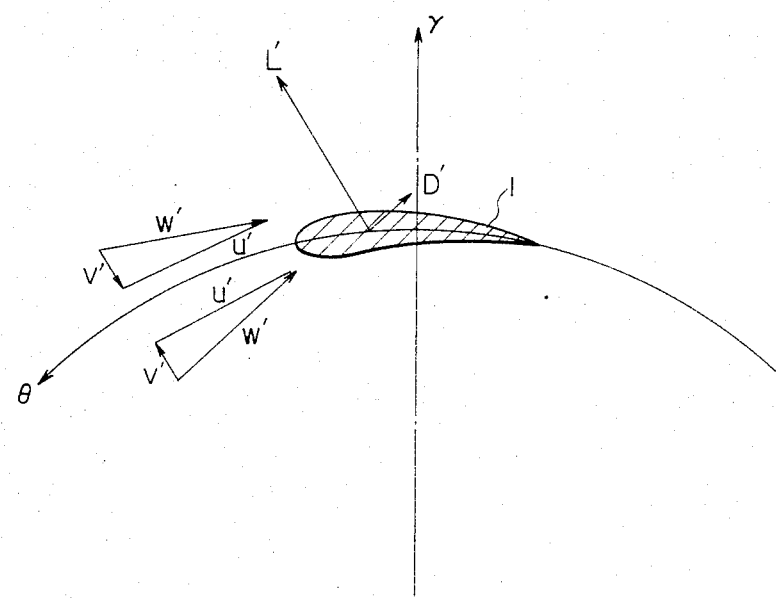

In FIG. 5, the flow with respect to the symmetrical blade of FIG. 5(a) can also be mapped into FIG. 5(b) using the same mapping function. The pattern in which the rotor blade 1 moves with the velocity U in the direction $\eta$ and the flow enters with the velocity V in the direction perpendicular to the direction $\eta$ so that lift L and drag D are produced by the relative velocity W in FIG. 5(a) is mathematically equivalent to the pattern in which the rotor blade 1 moves with the velocity U' in the direction $\theta$ and the flow enters with the velocity V' in the direction $\gamma$ perpendicular to the direction $\theta$ so that lift L' and drag D' are produced by the relative velocity W' in FIG. 5(b), which is obtained by the performing conformal transformation from the plane $(\xi, \eta)$ to the plane $(\gamma, \theta)$. In the plane $(\xi, \eta)$, even if the flow changes in direction from the positive direction of $\xi$ to the negative, a proper force can be generated in the direction $\eta$ if the values U and V are equal to each other in the case of a symmetrical blade. Accordingly, it is possible to produce a proper force in the direction $\theta$ independently of the direction of flow, that is, regardless of whether it flows radially outwardly with the velocity V or radially inwardly with the velocity V, in the plane $(\gamma, \theta)$ or FIG. 5(b), which is equivalent to the plane $(\xi, \eta)$ of FIG. 5(a). In FIGS. 5(a) and 5(b), the angle is the same while the velocity is different (conformal transformation).

The above description constitutes the principle forming the basis of the present invention.

Figure 6A:
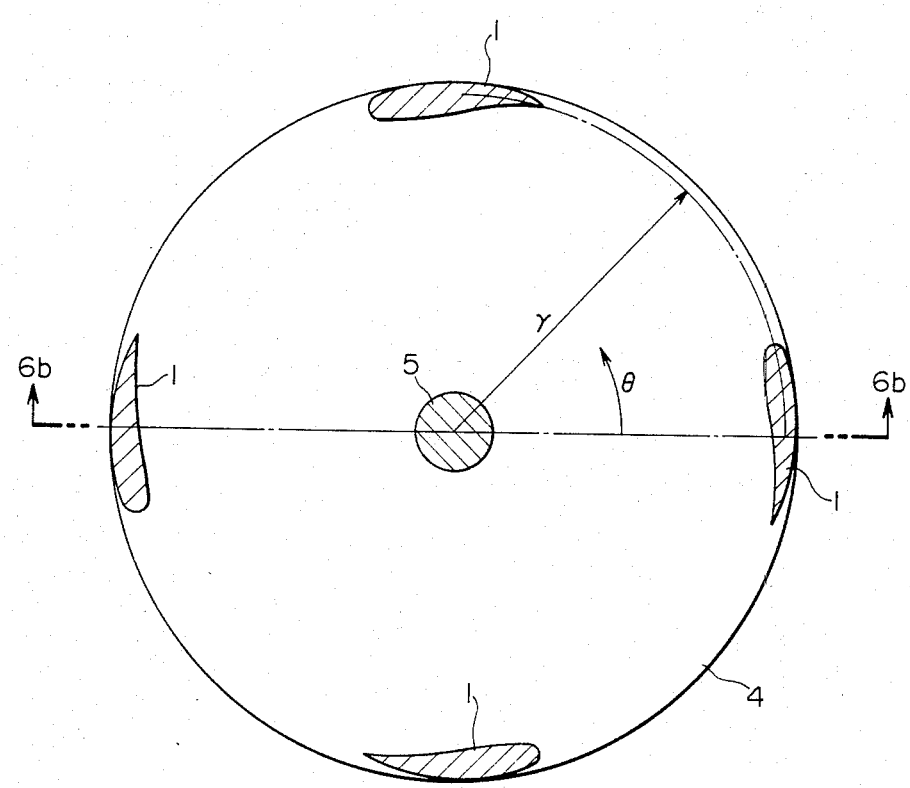
FIG. 6(a) is a cross-section along the line 6a—6a in FIG. 6(b) and FIG. 6(b) is a cross-section along the line 6a—6a in FIG. 6(a)
Figure 6B:
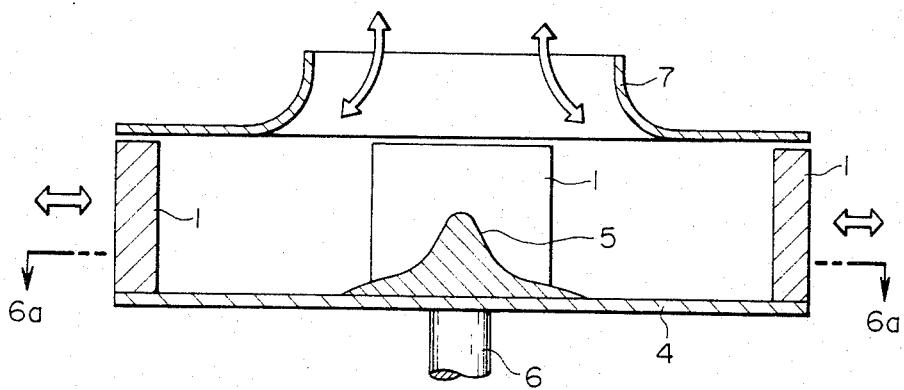

FIG. 6 shows an embodiment of the present invention, in which FIG. 6(a) is a cross-section along the line 6a—6a of FIG. 6(b), and FIG. 6(b) is a cross-section along the line 6b—6b of FIG. 6(a). In the drawings, reference numeral 1 denotes the rotor blade, 4 denotes a rotary pedestal or rotor, 5 denotes a flow path guide, 6 denotes a rotary shaft and 7 denotes a casing.

FIG. 6(a) shows the state in which four rotor blades 1 are attached to the rotary pedestal 4 with equal pitch so that adjacent blades are perpendicular to each other. The number of the blades is not always limited to four, and a plurality of blades in any number, two, three, or any other number, will do so long as they are arranged with equal pitch. In FIG. 6(b), the rotary shaft 6 is attached to the rotary pedestal or rotor 4 at the center of one side thereof and the mountain-like flow path guide 5 is provided on the other side. The casing 7 is provided coaxially with components 6, 4 and 5. The flow comes into/out-of the casing 7 as shown.

As described above with respect to FIG. 5, if a flow comes into or out of the casing when the rotor blade 1 is moving, a force can be produced in the rotor blade 1 in the direction $\theta$ by the relative velocity to thereby cause the rotary shaft 6 to rotate.

In the embodiment of FIG. 6, the rigidity of the rotor blade 1 is equal in the respective planes perpendicular to the rotary shaft 6.

Figure 7:
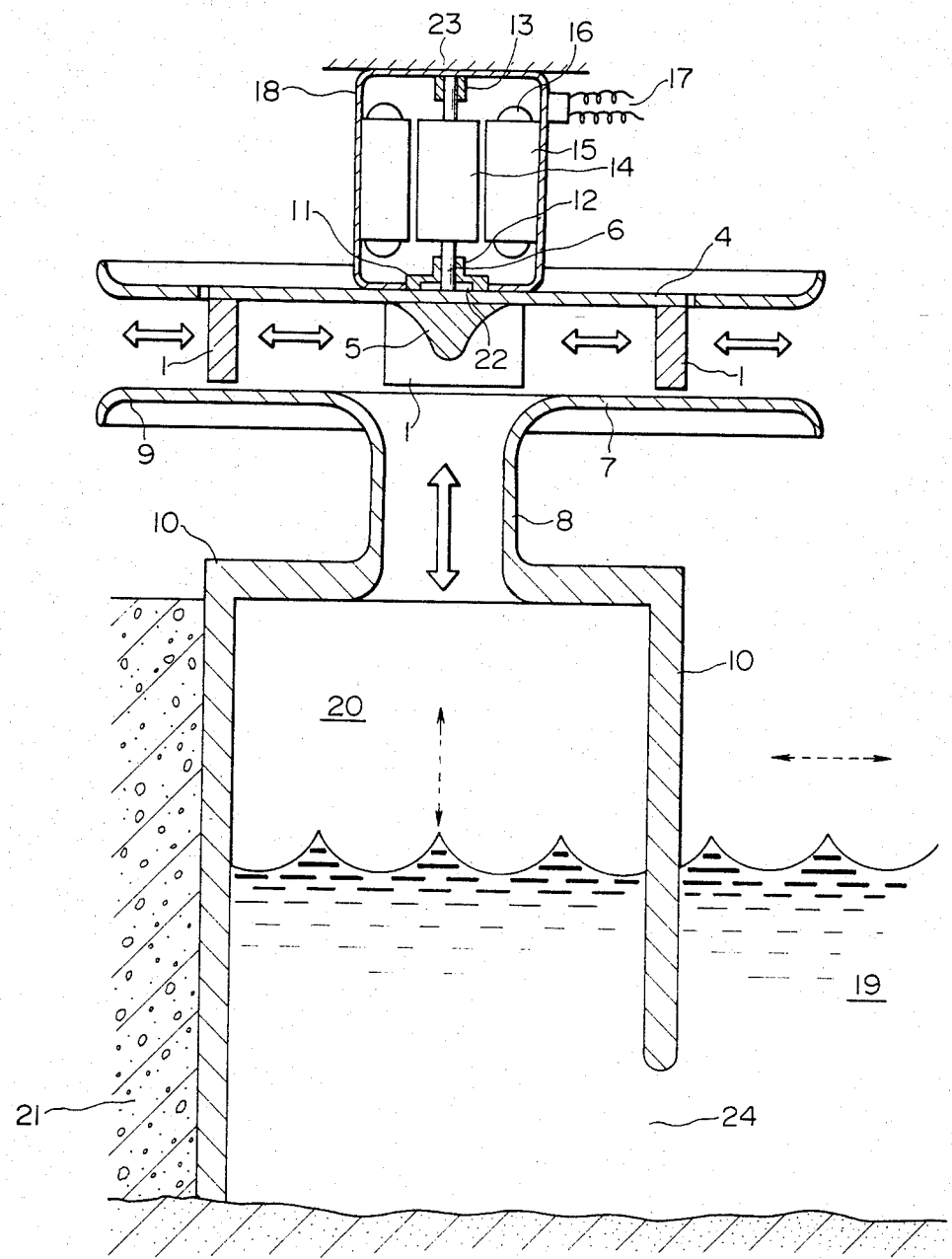
FIG. 7 is a cross-section of another embodiment in which the present invention is utilized for wave energy conversion.

FIG. 7 is a cross-section of an embodiment in which the present invention is applied to wave energy.

In FIG. 7, reference numeral 1 denotes the rotor blade; 4 denotes the pedestal; at 5 is the flow path guide; at 6 is the rotary shaft; 7 denotes the casing; 8 and 9 denote ducts; at 10 is an air chamber; 11, a thrust bearing; 12 and 13, radial bearings; 14, a generator rotor; 15, a generator stator; 16, a generator coil end; 17 an electric source line; 18, a generator casing; 19, waves in the sea; 20, air in the air chamber 10; at 21 is land; 22, a flange, 23; a generator stationary portion; and 24 denotes a wave intake.

Owing to the movement of the sea waves 19, the air 20 in the air chamber 10 fixed on the land area 21 is made to be compressed/expanded. As a result of the movement of the waves 19, the air 20 flows into and out of the duct 8. The casing 7 is arranged to communicate with the duct 8 so that when the wave flows into the air chamber 10, the air 20 flows into the casing 7 through the duct 8 and then flows out of the duct 9 into the atmosphere, passing by the rotor blade 1. During this period, torque causing the rotary shaft 6 to rotate is produced in the same way as described with respect to the principle of FIG. 5. Due to this torque, the pedestal 4 of FIG. 6(a) rotates counterclockwise. That is, the pedestal 4 rotates in the direction toward the wider ends of the rotor blade 1.

In FIG. 7, when the wave recedes, and the water level drops in the air chamber 10, on the contrary, air flows into the duct 9 from the atmosphere and reaches the casing 7, passing by the rotor blade 1. The air is then sucked into the air chamber 10 through the duct 8. In this case, although the direction of flow with respect to the rotor blade 1 is opposite to that in the case where the wave compresses the air in chamber 10, the direction of the torque produced in the rotor blade 1 does not change between the two cases as shown in FIG. 5. Accordingly, the rotary direction does not change even when air flows into the air chamber 10. In this case, therefore, the pedestal 4 rotates counter-clockwise in FIG. 6(a).

Accordingly, with an arrangement as shown in FIGS. 6 and 7, it is possible to obtain a turbine which rotates continuously in one direction in a reciprocating air flow generated by wave energy.

The flow path guide 5 attached to the pedestal 4 has the function of guiding the flow which axially flows in from the duct 8 and radially flows out through the casing 7 or which radially flows in from the duct 9 and axially flows out of the duct 8, to thereby prevent the loss of flow. The torque produced by the rotor blade 1 attached to the pedestal 4 is transmitted through the pedestal 4 to the rotary shaft 6 to cause the generator rotor 14 to rotate. Electric power generated owing to the rotation of the generator rotor 14 is derived from the generator stator 15 through the source line 17. The rotary shaft 6 is supported by the radial bearings 12 and 13. Since an axial thrust force may be generated in the pedestal 4, the pedestal 4 is supported by the thrust bearing 11 through the flange 22 attached to the rotary shaft 6.

The whole of the generator is fixed to the generator stationary section 23 through the generator casing 18. The whole of the air chamber 10 is fixed to the land mass 21.

As described above, according to the present invention, there is provided a turbine which can rotate in one direction in a reciprocating flow, including a rotor produced on the basis of mapping a symmetrical blade alignment from a plane $(\xi, \eta)$ to the plane $(\gamma, \theta)$, which turbine may be used as a wave force turbine as described in the foregoing embodiment.

FIG. 8 is a cross-section of another embodiment of the present invention. The air which flows into the casing 7 in parallel with rotary shaft 6 is caused by a flow path guide 5 to radially flow out of the casing 7 to the atmosphere to thereby generate torque in the rotor blades 1. The pedestal 4 transmits the torque generated in the rotor blades 1 to the rotary shaft 6, by which the energy is converted to power. Also in the case where air flows radially into the casing 7, the rotor blades 1 rotate in the same direction so that a power output is derived from the rotary shaft 6.

Figure 8A:
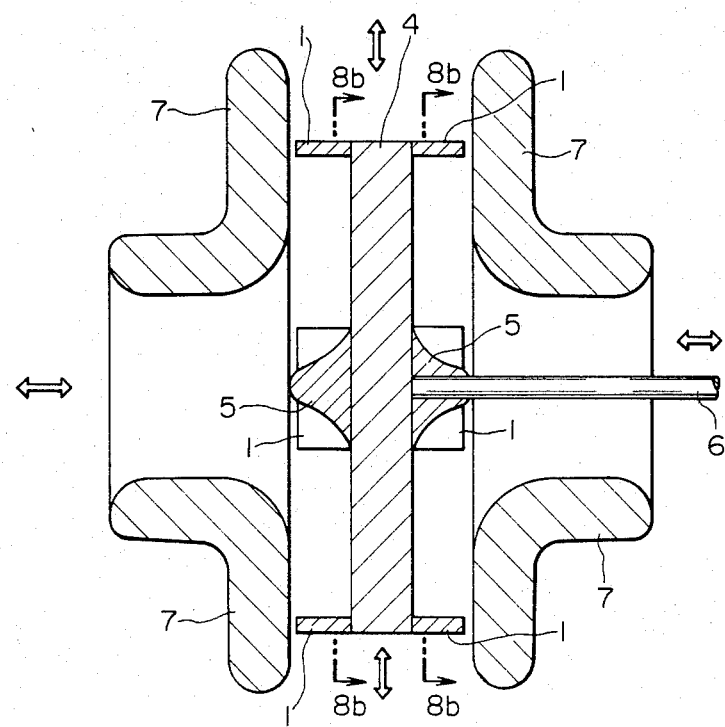
FIG. 8(a) is a cross-section of the embodiment and FIG. 8(b) is a cross-section along the line 8b—8b showing only the rotor blades.
Figure 8B:
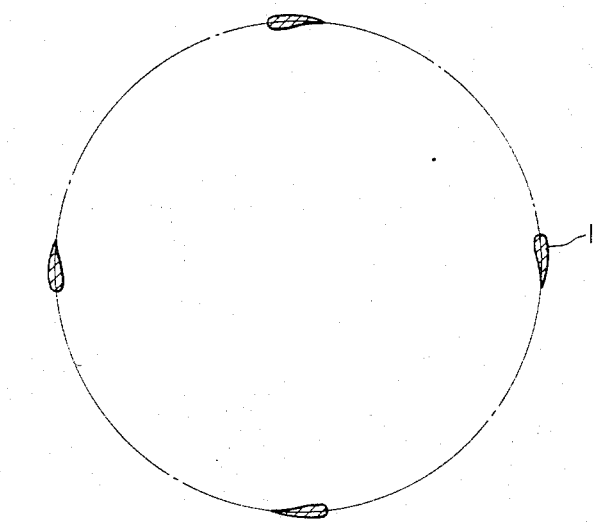

FIG. 8(b) is a cross-section of one set of the blades 1 provided at either one of the opposite sides of the pedestal 4 along the line 8b—8b in FIG. 8(a). In this case, the rotor blades 1 provided at each of the opposite sides of the pedestal 4 are arranged to rotate counterclockwise in FIG. 8(b).

With this arrangement, the thrust force can be cancelled because air flows in/out simultaneously from opposite sides with respect to the pedestal 4, as seen in FIG. 8(a).

FIG. 9 is a cross-section illustrating another embodiment of the present invention.

As will be appreciated from FIG. 9, in this embodiment, pedestals 4, each provided with rotor blades 1, are disposed symmetrically, and a generator is disposed between the pedestals 4. The flow comes in axially simultaneously from opposite sides of the generator section, so the rotor blades 1 generate torque which is transmitted to the rotary shaft 6 through the pedestals 4 to thereby generate electric power. Further, also in the case where the flow comes in axially through the casing, the rotary shaft 6 rotates in the same direction as in the previous case in accordance with the principle of FIG. 5, and therefore it is made possible to continuously generate electric power using wave energy or the like.

Figure 10:
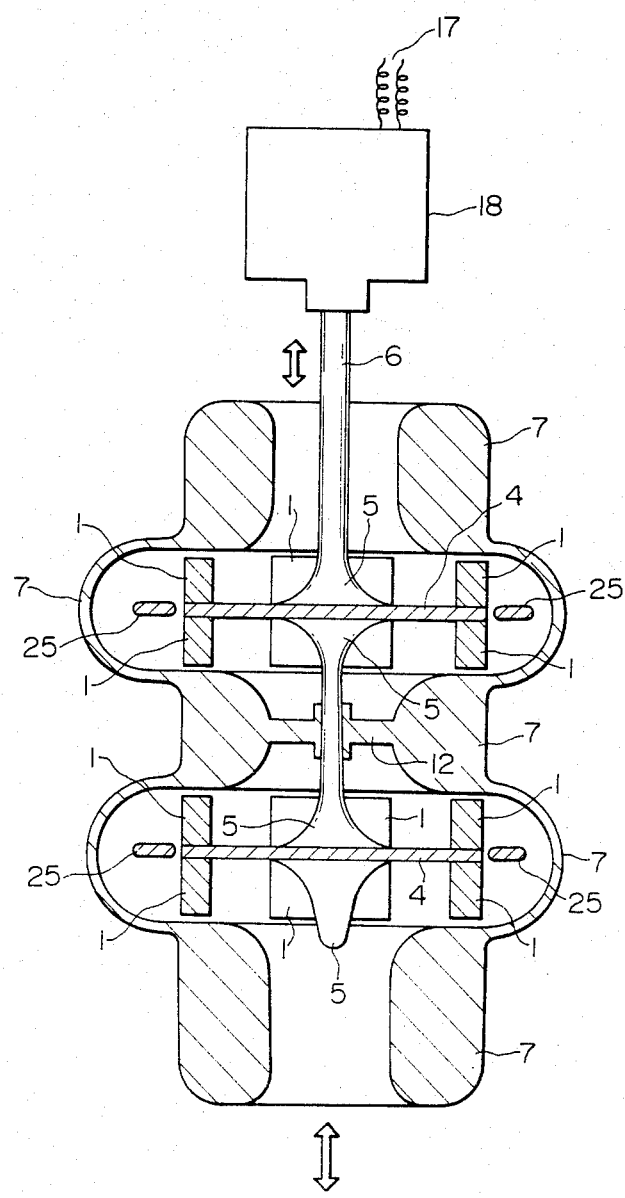
FIG. 10 is a cross-section of an embodiment where the turbines according to the present invention are arranged in series.

FIG. 10 is a cross-section of a further embodiment of the present invention, in which, the rotor blades 1 are attached to each of the opposite sides of each of two pedestals 4, and are connected serially in four stages.

For example, the air flows in from the bottom of FIG. 10 through the casing 7, passes by the four stages of rotor blades 1 from lower to upper and then comes out of the casing 7 at its upper portion to the atmosphere. Passing by each rotor blade, the fluid imparts a force to the respective rotor blades which transmit the torque to the rotary shaft 6 through the pedestals 4. The rotary shaft 6 is coupled with the generator 18 so that power is derived through the source line 17. The flow path guide 25 is provided so that when the flow which has passed by the lowermost rotor blades 1 flows into the next stage of rotor blades, the direction of flow may be smoothly changed. The flow path guide 5 is also provided for the purpose of smoothly changing the flow direction so as to minimize flow energy losses.

Figure 11:
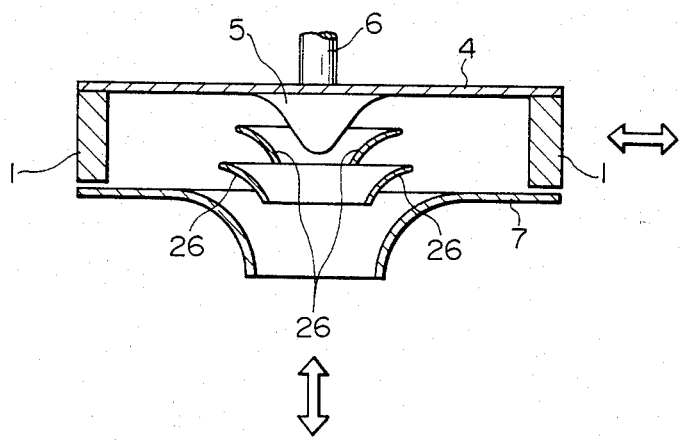
FIG. 11 is a cross-section of an embodiment of the turbine according to the present invention in which a guide vane is provided in the flow path.

FIG. 11 is a cross-section of still another embodiment, in which the reference numeral 26 denotes guide vanes.

In this embodiment, the flow comes axially into the casing 7, changes direction radially, gives rotary force to the rotor blades 1 and then passes out to the atmosphere. The loss of fluid energy when the flow changes the moving direction radially is minimized by the guide vanes 26 provided to smoothly lead the flow. This also applies to the case where the flow comes axially into the casing 7 and passes axially out.

Figure 12A:
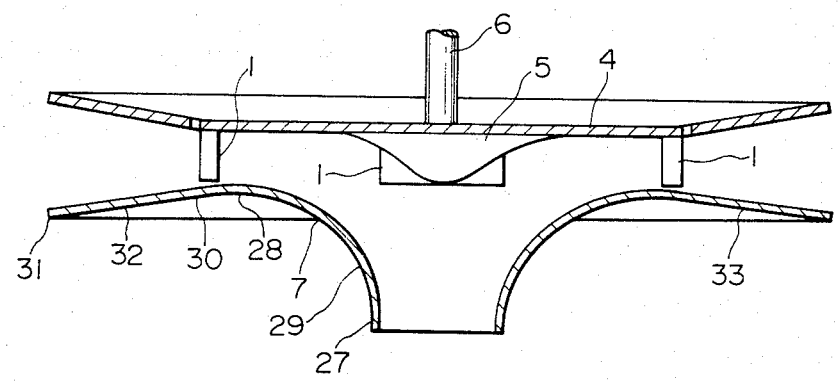
FIG. 12(a) is a cross-section along the line 12a—12a in FIG. 12(b) and FIG. 12(b) is a partial plan view of the rotary shaft side in FIG. 12(a)
Figure 12B:
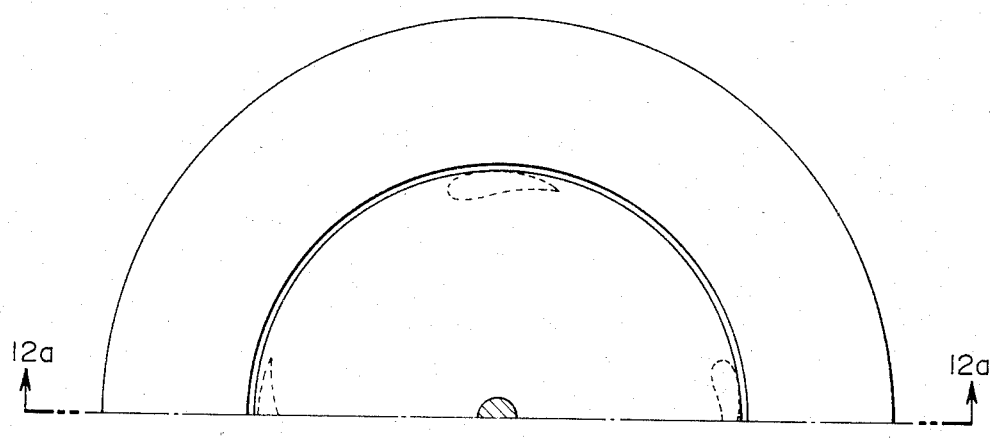

A still further embodiment is shown in FIG. 12 in which FIG. 12(a) is a cross-section along the line 12a—12a in FIG. 12(b) and FIG. 12(b) is a cross-section along the line 12b—12b in FIG. 12(a). In FIG. 12, reference numerals 27 and 28 denote end portions of the casing, 29 denotes a nozzle or diffuser, 30 and 31 denote outer casing end portions, 32 denotes a diffuser or nozzle, and 33 denotes an outer casing.

In the case where the fluid flows into the casing end portion 28 from the casing end portion 27, it is possible to increase the velocity of the fluid toward the rotor blades 1 if necessary by reducing the cross-sectional area of the flow path between the casing end portions 27 and 28. That is, by arranging the casing 7 in the form of nozzle 29. Further, if the pressure of the fluid which has passed by the rotor blades 1 is lower than the atmosphere pressure, the pressure of the fluid can be rapidly recovered by arranging the outer casing 33 so as to increase the cross-sectional area of the flow path between the end portions 30 and 31 of the outer casing 33 to cause the outer casing to serve as a diffuser 32.

Further, when fluid axially flows into the outer casing 33 from the end portion 31 thereof, contrary to the previous case, the casing 33 serves as a nozzle 32 increasing the velocity of the fluid toward the rotor blades 1 because of the reduction in cross-sectional area of the flow path between the end portions 31 and 30 of the outer casing 33.

Figure 13A:
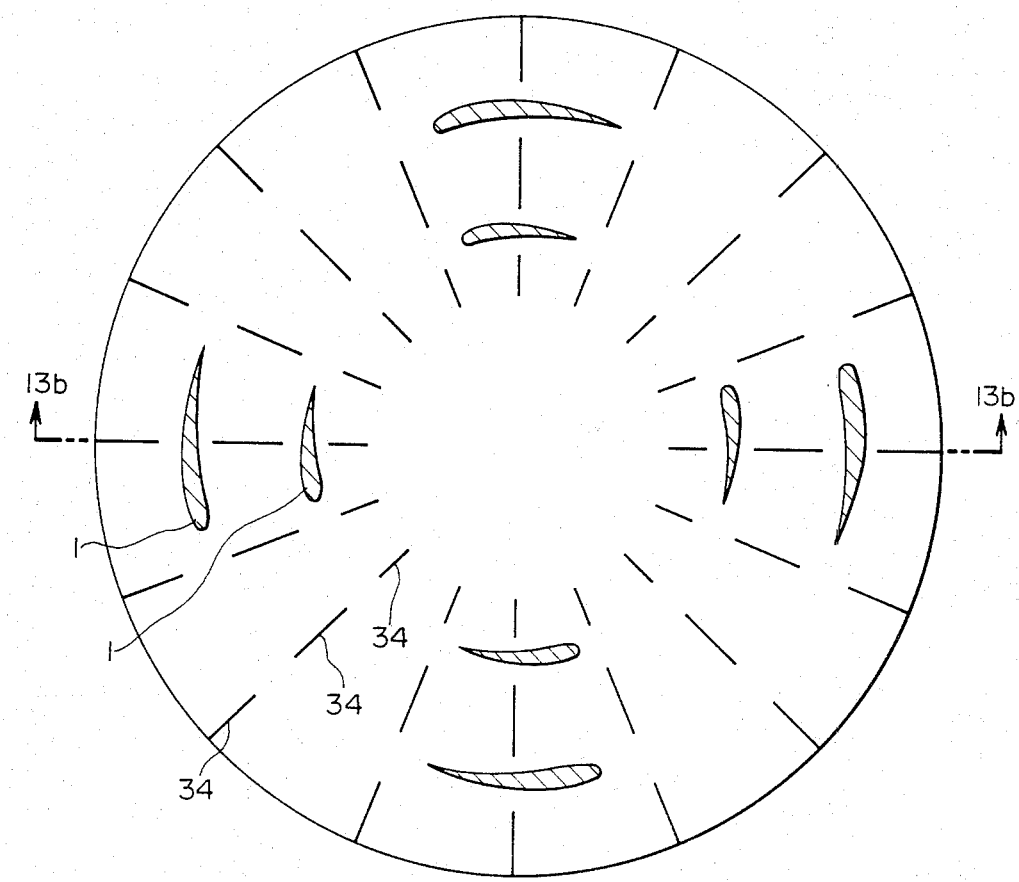
FIG. 13(a) is a cross-section along the line 13a—13a in FIG. 13(b) and FIG. 13(b) is a cross-section along the line 13b—13b in FIG. 13(a)
Figure 13B:
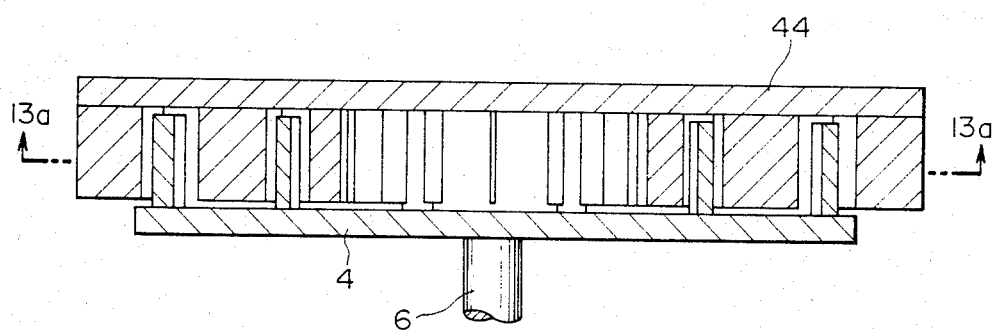

Another embodiment is shown in FIG. 13, in which FIG. 13(a) is a cross-section along the line 13a—13a in FIG. 13(b) and FIG. 13(b) is a cross-section along the line 13b—13b in FIG. 13(a). In FIG. 13, reference numerals 34 denote stator blades, and 44 is a stator side pedestal.

In this embodiment, two stages of rotor blades 1 are attached to the rotor side pedestal 4 and the stator blades 34 are attached to the stator side pedestal 44. Thus, it is possible to axially direct the fluid flowing toward the rotor blades 1. It is also possible to rectify the fluid which has passed by the rotor blades 1 and has a radial velocity component as well as a circumferential velocity component so as to be radially directed again, and to control the flow angle toward the rotor blades in the next stage. Particularly, as a matter of course, it is preferable to radially arrange the stator blades as shown in FIG. 13 in the case where the turbine is made to operate in a reciprocating flow such as for power generation by wave energy.

Similarly to the effect described above with respect to the embodiment of FIG. 12, the stator blades 34 not only operate as ordinary stator blades but also may serve as the vanes of nozzles similarly to 29 and 32 of FIG. 12.

Figure 14:
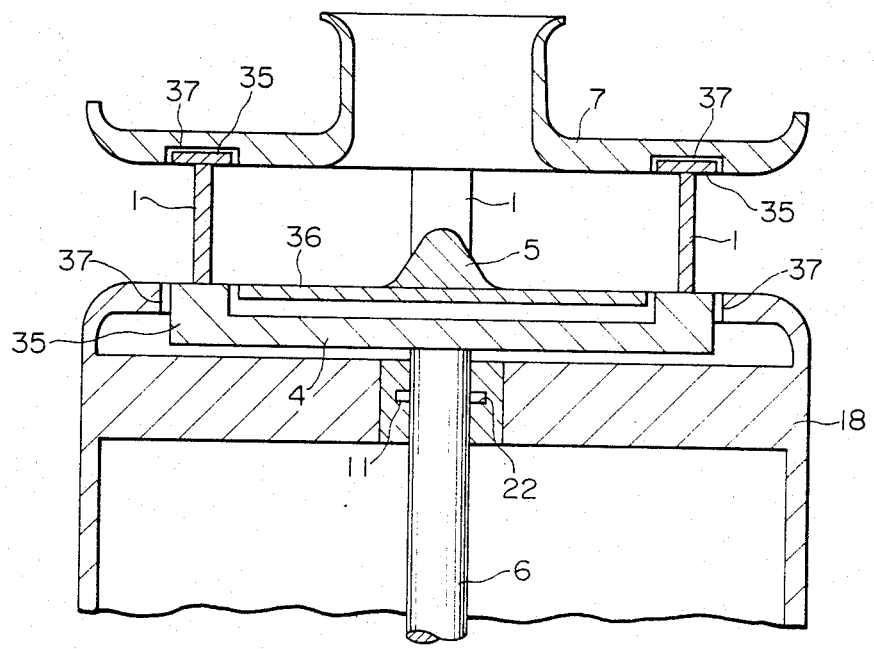
FIG. 14 is a cross-section showing another embodiment of the turbine according to the present invention in which a ring is provided for strengthening the rotor blades.

FIG. 14 is a cross-section of a further embodiment of the present invention, in which reference numeral 35 denotes a ring, 36 denotes a stationary pedestal, and 37 denotes a groove.

In this embodiment, the rotor blades are strengthened by the ring 35 so as to have sufficient strength against centrifugal force and the ring 35 is arranged so as to be able to rotate in the groove 37 so as not to hinder the flow path. Further, in this embodiment, the stationary pedestal 36 is provided separately from the rotor blades 1 and is fixed, for example, to the casing 7 using appropriate means. This eliminates a hindrance to providing rotary force to the rotor blades, the hindrance being caused by the boundary layer of flow which develops on the surface of the pedestal 4 in an arrangement in which the pedestal 4 rotates together with the rotor blades 1 as in the previous embodiment. By making the pedestal 36 stationary, the fluid is caused to flow radially onto the rotor blades. The rotor blades 1 are connected to the rotary shaft 6 through the pedestal 4 instead of the stationary pedestal 36 so as to make it possible to transmit torque to the rotary shaft 6.

Figure 15:
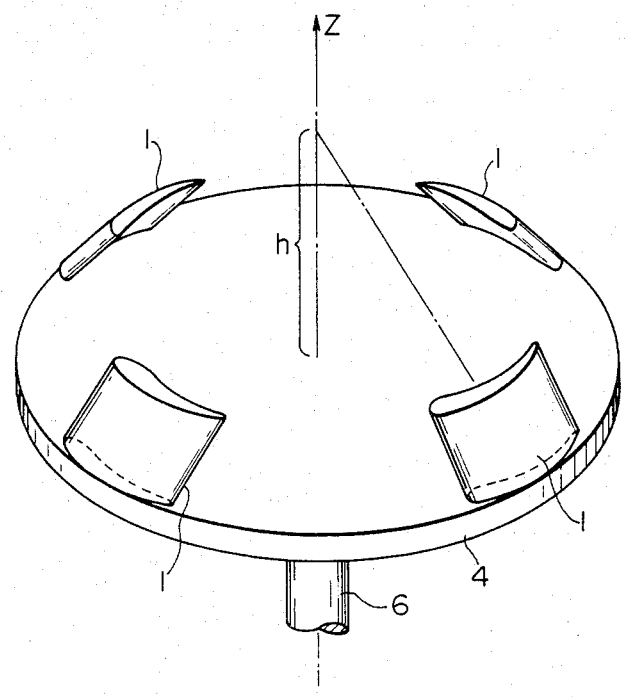
FIGS. 15 and 16 are perspective views each showing another embodiment of the turbine according to the present invention, in which the zero lift plane exists on a circular-cone surface.

FIG. 15 is a perspective view of a further embodiment of the present invention, in which a plurality of rotor blades are arranged so that a zero lift plane may exist in a circular-cone surface coaxial with the rotary shaft 6.

In this embodiment, the cross-section of the rotor blades 1 are on the periphery of one and the same circle, similarly to the case shown in FIG. 6(a), when the rotor blades 1 are cut by a plane perpendicular to the Z-axis in FIG. 15. In the embodiment of FIG. 15, as the value of Z increases, the diameter of the circle on the periphery of which the cross-sections of the rotor blades 1 are arranged becomes smaller. On the contrary, the rotor blades 1 may be arranged such that as the value of Z increases the diameter of this circle becomes larger.

Generally speaking, the zero lift plane is arranged with equi-pitch on a cylindrical or circular-cone surface coaxial with the rotary shaft 6.

Figure 16:
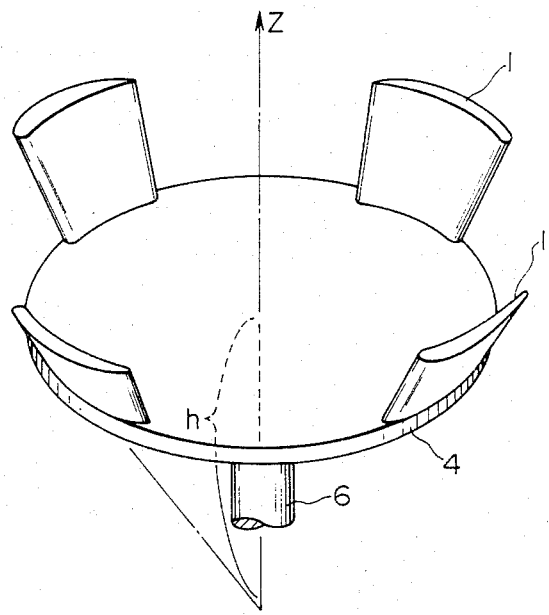

FIG. 16 shows an example in which the zero lift plane is arranged with equi-pitch on a circular-cone surface, the diameter of the cross-sectional circle of which becomes larger as the value of Z increases. The rigidity of the cross-section of the rotor blades 1 in a plane perpendicular to the axis of the circular-cone surface may either be the same or not the same as that of a cross-section of the rotor blades in another plane. Further, the rotor blade 1 may have the form of a forward blade, that is, a form in which the blade descends forwardly, or the form of backward balde, that is, a form in which the blade descends backwardly.

In the embodiment of FIGS. 15 and 16, h represents the height of the circular-cone surface at which the zero lift plane exists. When the value of h is infinite, the circular-cone becomes a cylinder and when it is zero the circular-cone surface becomes a plane, the latter case being coincident with the conventional case of FIG. 1.

Figure 2:
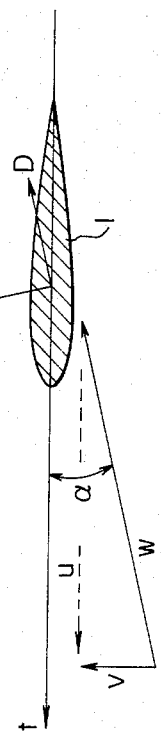
FIG. 2 is a diagram explaining the principles of operation of the conventional turbine.
Figure 3A:
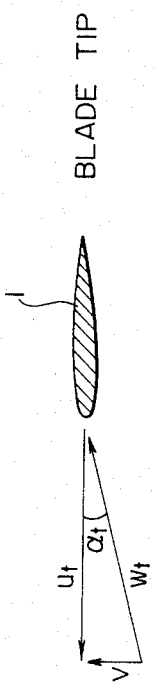
FIG. 3(a) is for the velocity triangle at the tip portion and FIG. 3(b) for the hub portion.
Figure 3B:
Figure 1A:
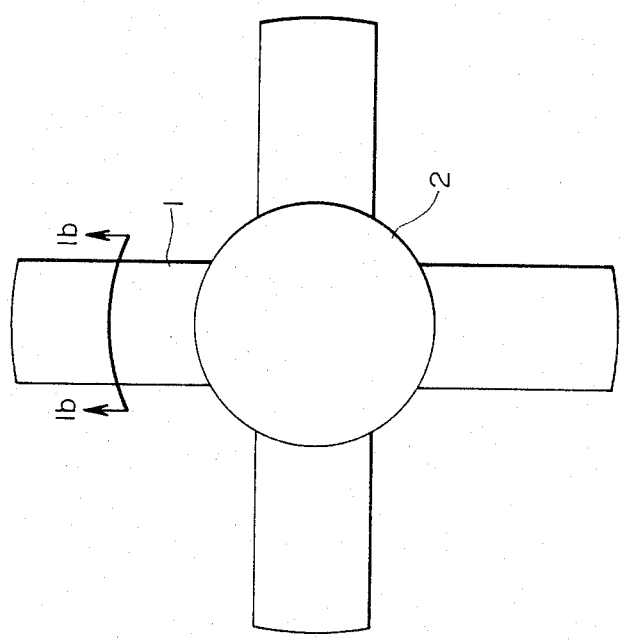
FIG. 1(a) is a front view of the turbine and 1(b) is a cross-section along the line 1b—1b in FIG. 1(a)
Figure 1B:

The relation between $\alpha_t$ and $\alpha_h$ as described with respect to FIG. 3 is improved from the relation $\alpha_t < \alpha_h$ in the conventional case of FIG. 1 as the value h increases. When the value h becomes infinite, that is, when the zero lift plane of the rotor blades exists on a cylindrical surface, the equation $\alpha_t = \alpha_h$ is satisfied theoretically, making it possible to efficiently absorb energy.

Further, the rigidity, which changes greatly in the radial direction in the conventional case shown in FIG. 1, is improved as the value h becomes larger and when the value of h is infinite, it is possible to make the rigidity equal on the respective planes perpendicular to the rotary shaft, so that optimum rigidity can be selected to make it possible to absorb energy efficiently.

According to the present invention, generally, in order to efficiently absorb energy, it is preferable to arrange the device such that the zero lift plane exists on an cylindrical surface, although the efficiency also depends on the attachment positions of the rotor blades on the pedestal, that is, the distance from the rotary center to the attachment positions of the rotor blades, and the number of the rotor blades. It is practical, however, to provide the zero lift plane on a circular-cone surface in a zone in which no stalling range occurs or where the stalling range is not so large, although there may be variations depending on the form of blade. This zone is in such a range that the angle between the bottom of the circular-cone and the peripheral surface is several tens of degrees.

Further, according to the present invention, generally, it is sufficient to arrange the zero lift plane of the rotor blades so as to fall on at least one of a cylindrical surface and a circular-cone surface which are coaxial with the rotary shaft. In other words, it will suffice to arrange the zero lift plane so as to fall on a symmetrical surface of revolution which is coaxial with the rotary shaft and which includes components parallel to the rotary shaft.

As described above, the present invention provides a turbine which is rotatable in one direction in a reciprocating flow and which is provided with a plurality of rotor blades whose zero lift plane exists on at least one of a cylindrical surface and a circular-cone surface coaxial with the rotary shaft.

In the case where the zero lift plane of the rotor blades exists on a cylindrical surface, the fluid flows radially onto the rotor blades and, further, the incoming flow is ideally uniform when viewed in the span direction of the rotor blades, so that the elevation angle α of the relative flow with respect to the rotor blades is the same as the span direction, and it is possible to make the energy conversion efficiency of the rotor blades uniform in the span direction. In the conventional case, there was a problem in that operation had to be performed in a range partially beyond a stalling elevation angle, while in the turbine according to the present invention there occurs no such problem. Further, the energy conversion ratio between the rotor blades and the driving fluid is easily controlled by the radius of the rotor blades, the span of the rotor blades and the number of the rotor blades, etc.

Further, as an additional effect, although the radial velocity component of the flow onto the rotor blades may be nearly zero in the boundary layer such as at the surface of the casing at which the viscosity of the fluid is affected, the relative flow with respect to the rotor blades comes in from the chordal direction of the rotor blades, that is, relative flow is generated so as to make the lift zero. This function is quite contrary to the case of ordinary turbo-machines in which the development of the boundary layer at the wall surface increases the elevation angle with respect to the blade to result in stalling, and is therefore very advantageous from the viewpoint of efficiency.

In the case where the zero lift plane exists on a circular-cone surface, on the other hand, the effect mentioned above is reduced as the form of the circular-cone surface varies from a cylindrical surface.

Further, the effect where the zero lift plane exists on a compound surface composed of a cylindrical surface and a circular-cone surface may be considered by decomposing the compound surface into individual cylindrical and circular-cone surfaces.

What is claimed is:

1. A turbine rotatable in one direction in a reciprocating flow, comprising:
   a rotary shaft;
   a rotary pedestal fixed to said rotary shaft and provided with a plurality of rotor blades having a zero lift plane on a circular surface coaxial with said rotary shaft, said circular surface being generated by rotating a straight line about said rotary shaft, said straight line held at a non-zero angle to a plane, said plane intersecting said rotary shaft at a perpendicular angle; and
   means for directing said reciprocating flow radially outward and radially inward when viewed from the center of rotation.

2. A turbine according to claim 1, in which said plurality of rotor blades have a configuration comprised of a blade alignment of a blade configuration, symmetrical in a plane of radial and angular coordinates about a radial coordinate, said coordinates mappable by conformal representation into the physical coordinates of said blade.

3. A turbine according to claim 1, wherein said directing means comprises a casing disposed adjacent to said blades and confining said flow for guiding said reciprocating flow.

4. A turbine according to claim 1, in which said plurality of rotor blades of said rotary pedestal are provided on both sides of said rotary pedestal.

5. A turbine according to claim 1, in which a plurality of said rotary pedestals are provided on said rotary shaft.

6. A turbine according to claim 1, in which said plurality of rotor blades of said rotor pededstal are provided in multiple states on at least one said surface which is different in diameter from said rotary shaft.

7. A turbine according to claim 3, in which stator blades are provided on said casing radially of said rotor shaft in order to direct the flow in the radial direction of said rotary shaft.

8. A turbine according to claim 1, in which said plurality of rotor blades are connected to each other by a ring.

9. A turbine according to claim 1, in which said rotor blades have equal rigidity in all planes through which said rotor blades pass, said planes being perpendicular to said shaft.

10. A turbine according to claim 1 wherein said flow directing means includes means for converting a flow in the axial direction of said shaft to a flow in the radial direction thereof, and from a radial direction thereof to an axial direction.

11. A turbine according to claim 1, said turbine including an air chamber having an opening for the admission of sea-waves, radial and axial fluid entrances/exits, one of said entrances/exits being coupled to said air chamber whereby a change in water level in said chamber effects a change in the pressure of the air in said chamber, and a generator coupled to said rotary shaft.

12. A turbine according to claim 5, each of said pedestals being coupled to inputs of a single generator.

13. A turbine according to claim 12, said generator being positioned between two of said pedestals.

14. A turbine according to claim 12, including flow diverting means for guiding a flow from one side of each pedestal to the other, rotor blades being provided on either side of said pedestals.

15. A turbine according to claim 10, said flow directing means including a centrally located circularly symmetrical body.

16. A turbine according to claim 15, further including at least one circularly symmetrical curved shell disposed above said body.

17. A turbine according to claim 1, further including fluid nozzle means for fluid approaching said rotor blades and fluid disperser means for fluid having passed by said rotor blades.

18. A turbine according to claim 17, said fluid nozzle means and said fluid disperser means comprise a shaped casing disposed adjacent said rotor blades for guiding fluid flow over said rotor blades.

19. A turbine according to claim 3, said pedestal being substantially disposed recessed within said casing.

20. A turbine according to claim 1, wherein said surface is a cylindrical surface.

21. A turbine according to claim 1, wherein said surface is a non-cylindrical conical surface varying in an axial direction.

* * * * *